US006724118B2

(12) United States Patent  (10) Patent No.: US 6,724,118 B2
Emery  (45) Date of Patent: Apr. 20, 2004

(54) ELECTRICAL ISOLATION LAYER SYSTEM STRAND ASSEMBLY AND METHOD OF FORMING FOR ELECTRICAL GENERATOR

(75) Inventor: Franklin T. Emery, Ft. Payne, AL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 10 days.

(21) Appl. No.: 09/880,583

(22) Filed: Jun. 13, 2001

(65) Prior Publication Data

US 2003/0000732 A1 Jan. 2, 2003

(51) Int. Cl.[7] .............. H02K 3/34; H02K 1/00; H02K 3/00; H01B 7/00; H01B 9/02
(52) U.S. Cl. ............... 310/215; 310/179; 310/40 R; 174/120 R; 174/137 R; 174/148
(58) Field of Search ............... 310/215, 179, 310/40 R, 10; 174/120 R, 137 R, 148

(56) References Cited

U.S. PATENT DOCUMENTS

| 1,784,997 | A | * | 12/1930 | Schenkel | 174/143 |
|---|---|---|---|---|---|
| 2,705,292 | A | * | 3/1955 | Wagenseil | 174/117 R |
| 2,707,204 | A | * | 4/1955 | Richardson et al. | 174/110 R |
| 2,789,155 | A | * | 4/1957 | Marshall et al. | 174/120 R |
| 2,917,570 | A | * | 12/1959 | Wolff et al. | 174/120 R |
| 2,939,976 | A | * | 6/1960 | Manni | 174/143 |
| 2,970,936 | A | * | 2/1961 | Richardson | 29/596 |
| 3,308,414 | A | * | 3/1967 | Ostrander et al. | 336/205 |
| 3,311,514 | A | * | 3/1967 | Matsunobu et al. | 156/53 |
| 3,462,544 | A | * | 8/1969 | King | 174/113 R |
| 3,679,925 | A | * | 7/1972 | Fort | 310/196 |
| 3,870,982 | A | * | 3/1975 | Shibano et al. | 335/297 |
| 3,960,803 | A | * | 6/1976 | Smith et al. | 156/330 |
| 4,105,984 | A | * | 8/1978 | Smith et al. | 336/205 |
| 4,226,823 | A | * | 10/1980 | Jansson et al. | 264/171.17 |
| 4,278,905 | A | * | 7/1981 | Chari et al. | 310/214 |
| 4,318,020 | A | * | 3/1982 | Meyer | 310/194 |
| 4,399,190 | A | * | 8/1983 | Iwabuchi et al. | 174/110 R |
| 4,403,163 | A | * | 9/1983 | Armerding et al. | 310/213 |
| 4,540,967 | A | * | 9/1985 | Chitose | 336/77 |
| 4,935,302 | A | * | 6/1990 | Hjortsberg et al. | 174/110 N |
| 5,066,881 | A | * | 11/1991 | Elton et al. | 174/102 SC |
| 5,067,046 | A | * | 11/1991 | Elton et al. | 174/102 SC |
| 5,175,396 | A | * | 12/1992 | Emery et al. | 174/120 SC |
| 5,246,783 | A | * | 9/1993 | Spenadel et al. | 428/461 |
| 5,306,976 | A | * | 4/1994 | Beckman | 310/215 |
| 5,455,392 | A | * | 10/1995 | Preu et al. | 174/120 R |
| 5,464,949 | A | * | 11/1995 | Markovitz et al. | 174/120 R |
| 5,574,325 | A | * | 11/1996 | von Musil et al. | 310/215 |
| 5,633,477 | A | * | 5/1997 | Smith et al. | 174/138 E |
| 5,723,920 | A | * | 3/1998 | Markovitz et al. | 310/42 |
| 5,945,764 | A | * | 8/1999 | Bendfeld | 174/109 |
| 5,973,269 | A | * | 10/1999 | Draper et al. | 174/120 R |
| 6,043,582 | A | * | 3/2000 | Markovitz et al. | 310/213 |
| 6,069,430 | A | * | 5/2000 | Tsunoda et al. | 310/180 |
| 6,194,665 | B1 | * | 2/2001 | Kuribayashi et al. | 174/120 R |
| 6,222,132 | B1 | * | 4/2001 | Higashiura et al. | 174/120 R |
| 6,225,564 | B1 | * | 5/2001 | Theodorides | 174/120 SR |
| 6,228,494 | B1 | * | 5/2001 | Emery | 156/286 |
| 6,296,935 | B1 | * | 10/2001 | Higashiura et al. | 428/373 |
| 6,329,055 | B1 | * | 12/2001 | Higashiura et al. | 428/383 |
| 6,420,812 | B1 | * | 7/2002 | Emery | 310/196 |

(List continued on next page.)

OTHER PUBLICATIONS http://www.dupont.com/nomex/main.*

Primary Examiner—Burton S. Mullins
Assistant Examiner—Pedro J. Cuevas

(57) ABSTRACT

An electrical isolation layer capable of inhibiting, if not preventing, a first conductive material from electrically passing or bleeding into a second conductive material and thereby causing a high resistance connection among the conductive materials is provided. The isolation layer has particular application when arranged between a conductive roebel filler and conductive strands sheathed by a porous insulator carrying a high voltage within a stator of a dynamoelectric machine used in a power generation plant.

20 Claims, 2 Drawing Sheets

U.S. PATENT DOCUMENTS

| | | | |
|---|---|---|---|
| 6,437,249 B1 * | 8/2002 | Higashiura et al. | 174/120 R |
| 6,498,415 B1 * | 12/2002 | Emery | 310/196 |
| 6,509,665 B1 * | 1/2003 | Nishiyama et al. | 310/215 |
| 6,524,702 B1 * | 2/2003 | Betso et al. | 428/379 |
| 6,525,272 B2 * | 2/2003 | Higashiura et al. | 174/120 R |
| 6,563,413 B1 * | 5/2003 | Ponweiser et al. | 336/186 |
| 6,623,838 B1 * | 9/2003 | Nomura et al. | 428/167 |
| 6,633,102 B2 * | 10/2003 | Nagai et al. | 310/215 |

* cited by examiner

ELECTRICAL ISOLATION LAYER SYSTEM STRAND ASSEMBLY AND METHOD OF FORMING FOR ELECTRICAL GENERATOR

FIELD OF THE INVENTION

The present invention relates in general to the field of an electrical isolation layers, and more particularly, to an electrical isolation layer arranged between a first conductive material and a second conductive material. The isolation layer is capable of inhibiting, if not preventing, either conductive material from electrically passing or bleeding into the other conductive material and thereby causing a high resistance connection among the conductive materials. The present invention has particular application when arranged between a conductive roebel filler and conductive strands sheathed by a porous insulator carrying a high voltage within a stator of a dynamoelectric machine used in a power generation plant.

BACKGROUND OF THE INVENTION

Many power generation plants produce electricity by converting energy (e.g. fossil fuel, nuclear fission, hydraulic head and geothermal heat) into mechanical energy (e.g. rotation of a turbine shaft), and then converting the mechanical energy into electrical energy (e.g. by the principles of electromagnetic induction). Some of these power generation plants, such as a fossil-fuel power generation plant, comprise a turbine, a generator and an exciter.

One aspect of the above-described power generation scheme involves conductive copper strands located within axially extending slots of the generator's laminated stator core. As a rotor rotates within the annular stator, magnetic flux induces an electric current through the conductive strands. To compensate for the decrease in magnetic flux density along the transverse (Z—Z) depth of the conductive strands, the conductive strands are transposed along their axial (Y—Y) length such that each strand experiences a similar amount of flux and thus carries a similar amount of current. The most common type of transposition is disclosed in U.S. Pat. No. 1,144,252 to Roebel and known in the art as roebelling, although other transposition types are known such as that disclosed in U.S. Pat. No. 4,128,779 to Salon.

Each conductive strand is typically sheathed with an inexpensive insulation, such as DACRON fiber glass (which has a relatively open weave with small porous microopenings), to insulate the individual strands from each other. The insulated strands are then roebelled. A filler is pressed into the roebel offsets (i.e. open space between the robelled insulated strands). The filler is advantageously conductive, such as resin rich felt or mica, to inhibit it from undergoing partial electrical discharge activity and to meet the power factor tip-up requirements in order to maintain a high resistance between strands. Since the conductive filler can electrically pass or bleed through the openings in the DACRON fiberfill glass strand insulation to the conductive strands (and/or vice-versa), low resistance electrical connections among the strands and/or filler can exist.

These low resistance connections are undesirable for a variety of reasons, such as compromising group-to-group coil electrical testing and meeting the power factor tip-up requirements in order to maintain a high resistance between strands.

There is thus a need to reduce, if not eliminate, low resistance connections among the strands and/or filler. There is also a need to electrically isolate a first conductive material from a second conductive material. There is also a need for a strand assembly that improves upon the prior art.

SUMMARY OF THE INVENTION

The present invention reduces, if not eliminates, low resistance connections among the conductive strands and/or conductive filler, as well as electrically isolates a first conductive material from a second conductive material.

One aspect of the present invention thus involves an electrical isolation layer system comprising, a first conductive material comprising a plurality of copper strands; a second conductive material comprising a roebel filler; and a NOMEX fiber spun laced felt having a dielectric strength of at least 300 volts per millimeter interposed at least partially between the copper strands and the roebel filler.

Another aspect of the present invention thus involves a strand assembly for use within a stator of a dynamoelectric machine of a power generation plant, comprising a plurality of roebelled conductive strands that extend along a generator length; an insulator sheathing each of the strands; a conductive filler at least partially surrounding the insulated strands; and an electrical isolation layer disposed at least partially between the insulated strands and the conductive filler material.

A method of forming a strand assembly that extends along an axial length, comprising sheathing a plurality of conductive strands with an insulating material; roebelling the insulated strands; arranging an electrical isolation layer at least partially over the insulated strands; and arranging a conductive filler at least partially over the insulated strands whereby the isolation layer electrically isolates the strands from the filler.

Further aspects, features and advantages of the present invention will become apparent from the drawings and detailed description of the preferred embodiment that follows.

BRIEF DESCRIPTION OF THE DRAWINGS

The above-mentioned and other concepts of the present invention will now be addressed with reference to the drawings of the preferred embodiments of the present invention. The illustrated embodiment is intended to illustrate, but not to limit the invention. The drawings contain the following figures, in which like numbers refer to like parts throughout the description and drawings and wherein.

DETAILED DESCRIPTION OF THE PREFERRED EMBODIMENT

The invention described herein employs several basic concepts. For example, one concept relates to an electrical isolation layer disposed between a first conductive material (e.g. copper strands) and a second conductive material (e.g. roebel filler) which reduces, if not eliminates, low resistance connections among the conductive materials. Another concept relates to an improved strand assembly comprising a plurality of conductive strands sheathed by a relatively porous open weave insulator and a conductive roebel filler that demonstrates minimal low resistance connections among the strands and/or filler through the arrangement of an electrical isolation between the strands and filler.

The present invention is disclosed in context of an exemplary generator stator 10. The principles of the present invention, however, are not limited to generator stators, and can be used in connection with other areas within a generator that have similar requirements to isolate conductive elements or to reduce, if not eliminate, low resistance connections between conductive elements, such as a generator rotor strand assembly and the like. It will be understood by one skilled in the art, in light of the present disclosure, that the present invention disclosed herein can also be successfully utilized in connection with areas outside the generator field and outside the power generation field that have similar requirements to isolate conductive elements or to reduce, if not eliminate, high resistance connections between conductive elements. One skilled in the art may also find additional applications for the apparatus, components, configurations and methods disclosed herein. Thus, the illustration and description of the present invention in context of an exemplary generator stator 10 is merely one possible application of the present invention. However, the present invention has been found particularly suitable in connection with generator stators.

Figure 1:
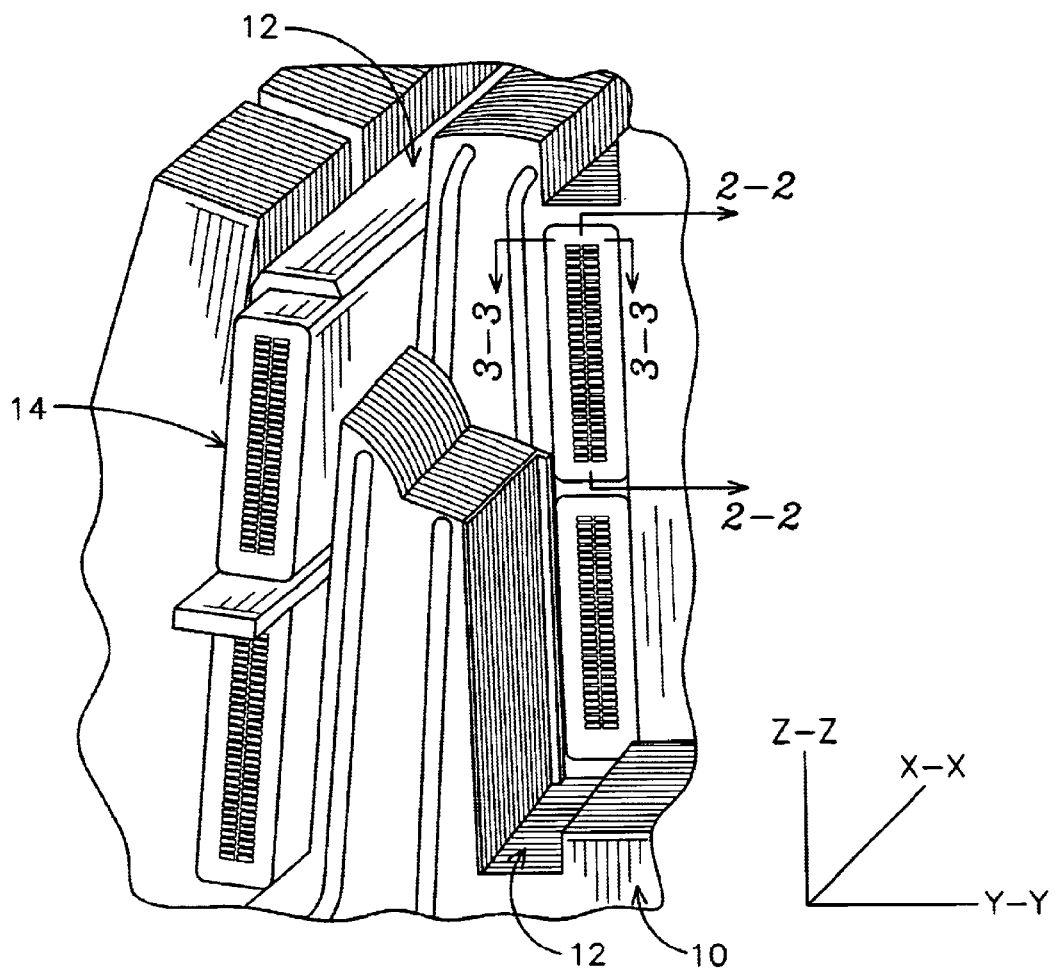
FIG. 1 is a cut view of a portion of a generator stator, showing axially extending slots within which strand assemblies of the present invention can be placed.

To assist in the description of the invention described herein, the following terms are used. Referring to FIG. 1, a "longitudinal axis" (X—X) extends along the length of the stator 10. A "lateral axis" (Y—Y) extends along the width of the stator 10. A transverse axis" (Z—Z) extends normal to both the longitudinal and lateral axes, and provides the third or depth dimension of the stator 10. In addition, as used herein, the "longitudinal length" refers to a length substantially parallel to the longitudinal axis, the "lateral length" refers to a length substantially parallel to the lateral axis, and the "transverse length" refers to a length substantially parallel to the transverse axis. Further, "axial" and "radial" are used to describe relative direction, with "axial" describing a direction that is parallel to the longitudinal length of the stator 10 and "radial" describing a direction that is perpendicular the nonrotating center length of the stator 10.

Figure 2:
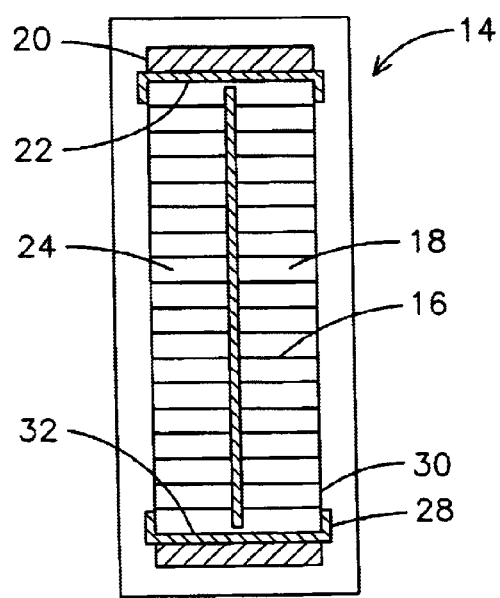
FIG. 2 is a detail side elevation view of a strand assembly of FIG. 1 taken along cut line 2—2.

FIGS. 1 and 2 show axially extending slots 12 formed along the stator 10. The slots 12 are sized and configured to accept and secure at least one strand assembly 14 (or vice-versa). Each strand assembly 14 preferably comprises a plurality of transposed (e.g. robelled) conductive (e.g. copper) strands 16 that are sheathed by an insulator 18 (e.g. DACRON fiber-glass), with a conductive filler 20 (e.g. mica) disposed about (completely or partially) the insulated 18 strands 16, and an isolation layer 22 disposed about (completely or partially) the conductive filler 20. As is understood by those skilled in the art, many other types of transpositions, strands 16, insulators 18, and fillers 20 can be used to form the strand assembly 14. Additional elements can also be used.

Referring to FIGS. 2 and 3, the isolation layer 22 is advantageously arranged between the insulated 18 strands 16 (the insulated strands hereinafter referenced as 24) and the filler 20 to electrically isolate the insulated strands 24 from the filler 20. By electrically isolating the insulated strands 24 from the filler 20, high resistance connections among the insulated strands 24 and filler 20 are inhibited, if not prevented.

The isolation layer 22 preferably has at least one of the following characteristics, more preferably most of the following characteristics, and most preferably all of the following characteristics. The isolation layer 22 is a dielectric isolate conductive materials and to distribute voltage across it during stator 10 operation. The isolation layer 22 is flexible to generally conform to adjacent surfaces and thereby inhibit gaps from forming between itself and the adjacent surfaces. The isolation layer 22 is bondable to adjacent surfaces and thereby inhibits gaps from forming between itself and adjacent surfaces. The isolation layer 22 is capable of withstanding the environment within which it operates.

The isolation layer 22 should have a dielectric strength of at least 300 volts per millimeter and preferably at least 500 volts per millimeter. Suitable dielectrics include polymers such as polyphenylene sulfide, polythiophene, polyacetylene and polypropylene, glass such as E-glass and S-glass, epoxy, resin, fabrics having NOMEX, fiber, KEVLAR fiber or similar fibers, mica, and the like. NOMEX and KELVAR are registered trademarks of E. I. DuPont De Nemours and Company.

The isolation layer 22 should be sufficiently flexible to conform to the irregularities that characterize the insulated strand 24 surface caused by the roebel offsets (e.g. hills and valleys) or other surface irregularities. Suitable materials that may be inherently sufficiently flexible for this purpose include polymers, epoxy, fabric, mica, laminates, and the like. Semi-rigid materials may also be used, as well as rigid materials that are spun laced and the like. These materials are preferably formed as a felt, tape, and the like but can also be embodied in other forms so long as they provide the sufficient flexibility.

The isolation layer 22 should be suitably bondable to adhere to adjacent surfaces and thereby inhibit gaps from forming between itself and the adjacent surfaces. Suitable bonding can be achieved by covering the isolation layer 22 with an adhesive 26 such as epoxy, acrylic and the like, or using a material that is inherently suitably bonding. If an adhesive 26 is used, the adhesive 26 can partially or completely cover the isolation layer 22, and could cover one or more sides or portions of the isolation layer 22. The adhesive 26 is advantageously thermally activated so that it cures during the stand assembly 14 curing process, discussed in more detail below. The adhesive need not have a uniform thickness.

The isolation layer 22 should be capable of withstanding the environment within which it operates, including withstanding stator temperatures of at least 130° C. and preferably at least 155° C. Suitable materials include resins, plastics, NOMEX fiber, epoxies, and the like.

Within the exemplary context of use within a generator stator 10, an isolation layer 22 preferably comprising a NOMEX fiber spun laced felt material (such as one commercially available by the Electrolock, Inc. company of Hiram, Ohio) and coated on one side with an epoxy adhesive, (such as one commercially available by Eletrolock, Inc.), can meet the above-described preferred characteristics. Other suitable materials include low temperature DACRON fiberfill and the like.

Still referring to FIGS. 2 and 3, the isolation layer 22 is preferably arranged between the insulated strands 24 and the filler 20 to electrically isolate the insulated strands 24 from the filler 20 so that the filler 20 cannot pass or bleed through the porous strand insulation 18 voids and into the strands 16.

Figure 3A:
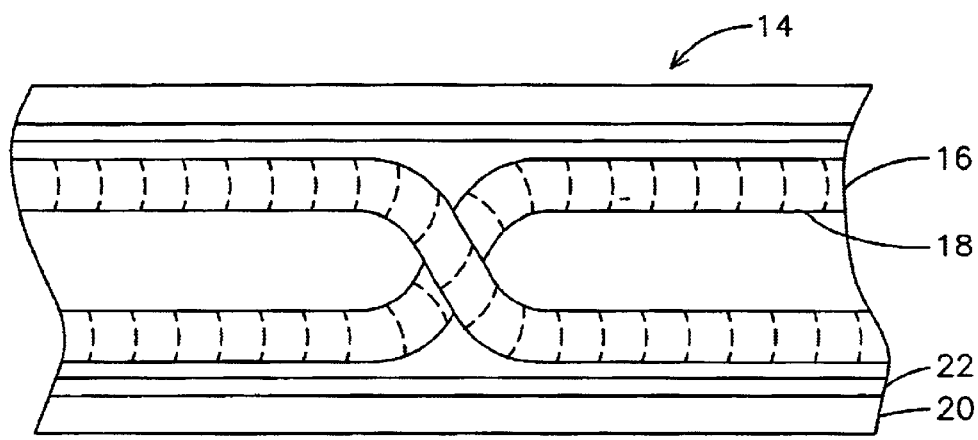
FIG. 3A is a detail side elevation view of FIG. 1 taken along cut line 3—3, showing two roebelled conductive strands sheathed by strand insulation, partially surrounded by an isolation layer, and partially surrounded by a filler.

As shown in FIG. 3A, to achieve this purpose, the isolation layer 22 is preferably placed above the upper surface (Z—Z) of the insulated strands 24 and below the lower surface (Z—Z) of the insulated strands 24, but below the upper surface (Z—Z) of the filler 20 and above the lower surface (Z—Z) of the filler 20. The width (X—X) of the isolation layer 22 is advantageously about 0.1 to about 2 inches, preferably about 0.5 inches, wider than the width of the insulated strands 24 so that the ends 28 of the isolation layer 22 can extend or wrap along the edges 30 of the insulated strands 24 in order to isolate any filler 20 that may extend along the edges 30 of the insulated strands 24 (best shown in FIG. 1).

Figure 3B:
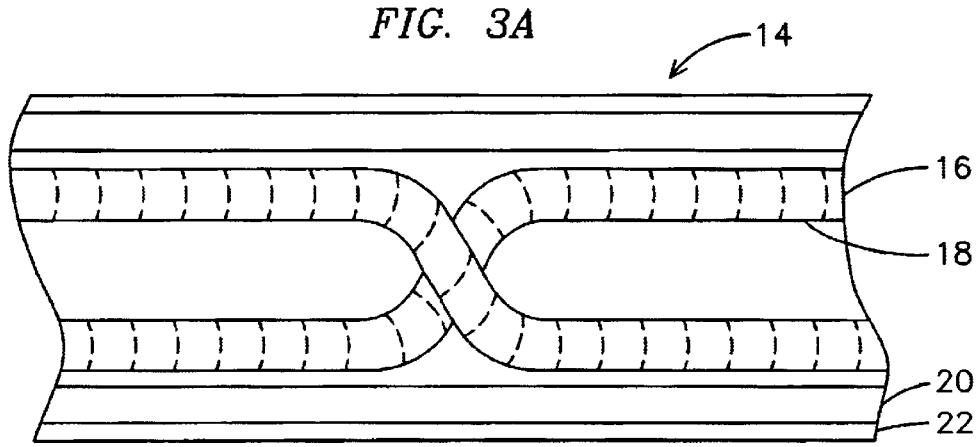
FIG. 3B is a detail side elevation view of FIG. 1 taken along cut line 3—3 similar to FIG. 3A, showing another arrangement of the strand assembly, where the isolation layer sheathes the insulated strands.

As shown in FIG. 3B, the isolation layer 22 could alternatively be arranged to completely surround the insulated strands 24, and not leave the edges 30 of the insulated strands 24 uncovered. However, it has been found suitable to arrange the isolation layer 22 as described above with FIG. 3A, and such an arrangement tends to be easier to assembly and cost less than completely surrounding the insulated strands 24 as now described with FIG. 3B.

Of course, if the filler 20 is arranged in a different manner, the isolation layer 22 should accordingly be arranged differently such that it is between (completely or partially) and isolates the insulated strands 24 and the filler 20.

A section, preferably a side 32, of the isolation layer 22 is covered with the epoxy adhesive 26 and adhered to at least a portion of the insulated strands 24. However, as explained above, the adhesive 26 could be placed on two sides 32 of the isolation layer 22 to adhere to the insulated strands 24 and filler 20, or could not be placed on any side 32 of the isolation layer 22 to merely interpose (but not adhere to) the insulated strands 24 and filler 20.

The strand assembly 14 can be made by first roebelling the insulated strands 24. The isolation material 22 is then placed on the upper and lower portions of the insulated strands 24 as described in connection with FIG. 2A above, or sheathed around the insulated strands 24 as described in connection with FIG. 2B. Next, the filler 20 is placed on the isolation layer 22 to form the strand assembly 14. The strand assembly 14 is then cured by heating at a temperature of about 150° and a pressure of about 500 psi for about 120 minutes, as is known by those skilled in the art.

Test Results

Figure 4:
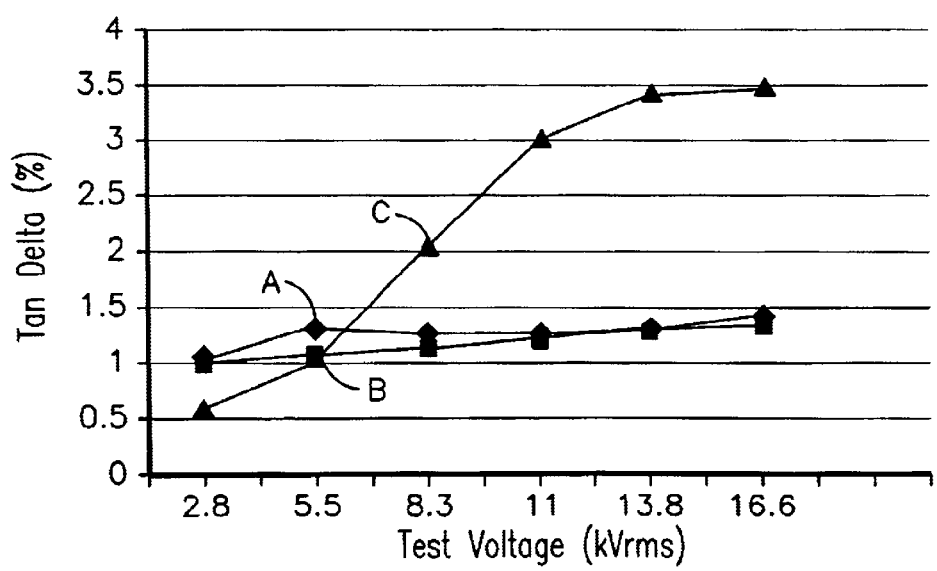
FIG. 4 is a data plot for the discussed test results, showing tan delta versus voltage.

Referring to FIG. 4, two conventional coils (A, B), each comprising about 40 roebelled insulated strands 24, were processed in accordance with the above teachings of the present invention and as commonly understood by those skilled in the art. After coil cure, a strand-to-strand test was performed at a test voltage of 250 VDC. All readings were well above 20 Mega ohm and no strand-to-strand low resistance connections were found. A second strand-to-strand test was also performed after forming the coil end turns of the coils A, B, with similar results.

The two coils A, B were then insulated with groundwall insulation, and then impregnated and cured. A third strand-to-strand test performed at 250VDC. All readings were above 100 Mega ohms.

The two coils A, B were then power factor tested and the tip-ups were 0.2% and 0.23% with normal values of initial Tan Delta. The normal initial value of Tan Delta (@2.8 kV) was on the order of 1%, indicating no high steady state resistance present in the coils A, B that could result from the isolation of the conductive filler 20 from the copper strand potential. Both coils A, B passed a 37.2 kV one-minute voltage ground test. Coil cross section shape was good and both coils passed a tap test, indicating good strand insulation 18 consolidation. FIG. 4 shows the plot of power factor for three coils: the two above-described coils A, B having a conductive filler 20 and an isolation layer 22, and a third coil C having a non-conductive filler and no isolation layer. The two coils A, B with the isolation layer 22 passed the power factor tip-up test while the third coil C without the isolation layer did not pass the tip-up test.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. It will be further understood that not all of the above-described aspects or elements are required to provide other strand assemblies or isolation layers, especially when used outside the generator or power generation field. Accordingly, the scope of the invention is intended to be defined only by the claims that follow.

What is claimed is:

1. An electrical isolation layer system, comprising:
   a first conductive material comprising a plurality of copper strands;
   a second conductive material comprising a roebel filler; and
   a NOMEX fiber spun laced felt having a dielectric strength of at least 300 volts per millimeter and being positioned to abut an outer surface of the copper strands and an inner surface of the roebel filler to thereby be interposed at least partially between the copper strands and the roebel filler.

2. The isolation layer system of claim 1, wherein the felt has a dielectric strength of at least 500 volts per millimeter.

3. The isolation layer system of claim 1, wherein the plurality of copper strands include at least 30 roebelled copper strands.

4. The isolation layer system of claim 3, wherein the copper strands are sheathed by a porous insulating material.

5. The isolation layer system of claim 3, wherein the roebel filler includes a mica material.

6. The isolation layer system of claim 1, wherein the roebel filler includes a mica material.

7. The isolation layer system of claim 1, wherein the felt is arranged above the upper surface of the copper strands and below the lower surface of the roebel filler.

8. The isolation layer system of claim 1, wherein the felt is arranged below the upper surface of the copper strands and above the lower surface of the roebel filler.

9. The isolation layer system of claim 1, wherein the felt is arranged to sheath at least one copper strand.

10. The isolation layer system of claim 9, wherein the felt is arranged to sheath all the copper strands.

11. The isolation layer system of claim 1, wherein the isolation layer has an adhesive coated on at least one side of the isolation layer.

12. A strand assembly for use within a stator of a dynamoelectric machine of a power generation plant, comprising:
   a plurality of roebelled conductive strands that extend along a generator length;
   an insulator sheathing each of the strands;

a conductive filler at least partially surrounding the insulated strands; and an electrical isolation layer positioned to abut an outer surface of the plurality of roebelled strands and an inner surface of the conductive filler and disposed at least partially between the insulated strands and the conductive filler material.

13. The strand assembly of claim 12, wherein the isolation layer has a dielectric strength of at least 300 volts per millimeter.

14. The strand assembly of claim 12, wherein the isolation layer comprises a NOMEX fiber spun laced felt.

15. The strand assembly of claim 12, wherein the isolation layer has an adhesive covering at least one side of the isolation layer.

16. The strand assembly of claim 12, wherein the isolation layer can withstand an operating temperature of at least 130° C.

17. A method of forming a strand assembly that extends along an axial length, comprising:

sheathing a plurality of conductive strands with an insulating material;

roebelling the insulated strands;

arranging an electrical isolation layer at least partially over the insulated strands; and arranging a conductive filler at least partially over the insulated strands whereby the isolation layer abuts an outer surface of the insulated strands and abuts the inner surface of the conductive filler and thereby electrically isolates the strands from the filler.

18. The method of claim 17, wherein the isolation layer is arranged above the upper surface of the insulated strands and below the lower surface of the insulated strands.

19. The method of claim 17, wherein the isolation layer sheathes the insulated strands.

20. The method of claim 17, wherein the insulator used to insulate the strands has a porous open weave.

* * * * *